Patented Jan. 15, 1924.

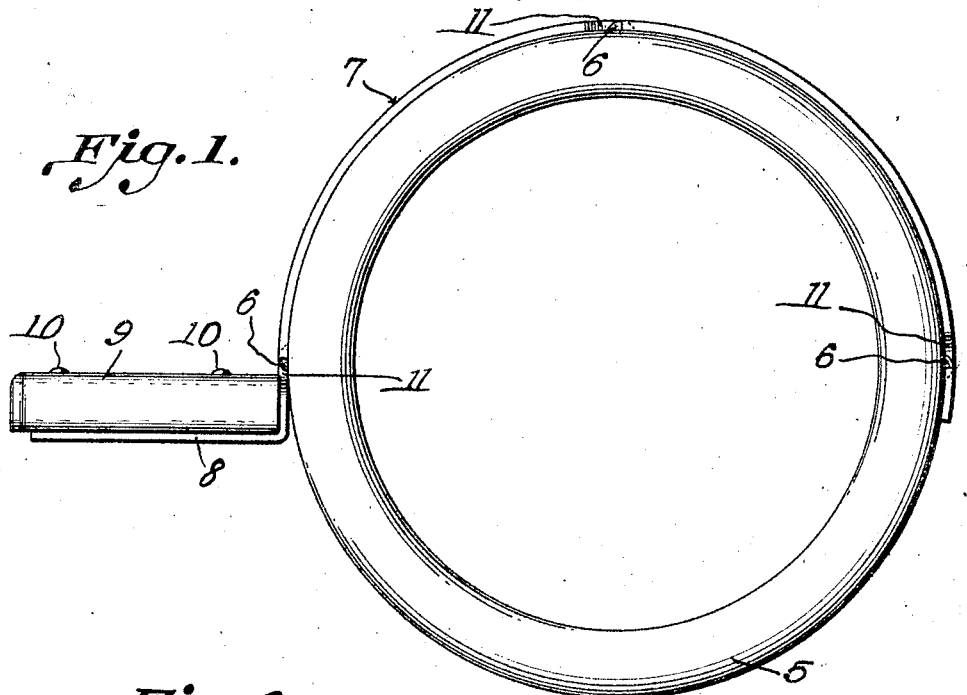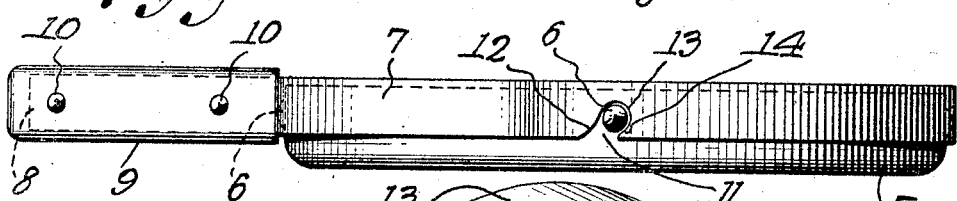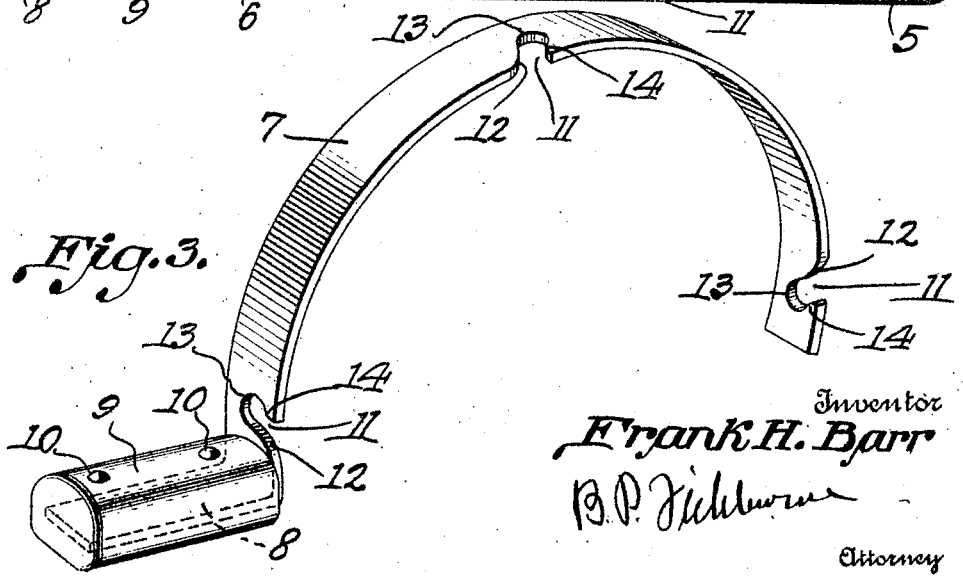

1,480,653

UNITED STATES PATENT OFFICE.

FRANK H. BARR, OF WASHINGTON, DISTRICT OF COLUMBIA.

IMPLEMENT FOR TURNING LENS RIMS.

Application filed January 3, 1923. Serial No. 610,444.

*To all whom it may concern:*

Be it known that I, FRANK H. BARR, a citizen of the United States, residing at Washington, in the District of Columbia, have invented certain new and useful Improvements in Implements for Turning Lens Rims, of which the following is a specification.

My invention relates to an implement designed especially for use in removing the lens rims from automobile headlights, particularly the rims upon the headlights of the Ford automobile.

As is well known, the standard headlight of a Ford automobile embodies a casing within which is located the bulb. The lens is carried in a rim, which is removably mounted upon the front end of the casing. This rim is provided with studs or rivets, the outer or headed ends of which are arranged exteriorly of the rim, while their inner ends project into the rim, and enter L-shaped slots formed in the casing of the headlight. To remove the lens rim, whereby access may be had to the bulb, it is necessary to turn the rim with respect to the casing. On a new car, this may ordinarily be done, but when a car has been used a considerable length of time, the rim frequently becomes stuck to the casing, due to rust or the like, whereby it is impossible to remove the rim, by hand. It therefore frequently occurs that a driver will find that the bulbs in his headlight, may burn out, and he is unable to renew the same, owing to the impossibility of removing the rim.

An important object of the invention is to provide a device of the above mentioned character, which is extremely simple in construction, inexpensive to manufacture, strong and durable.

Other objects and advantages of the invention will be apparent during the course of the following description.

In the accompanying drawings, forming a part of this specification, and in which like numerals are employed to designate like parts throughout the same, Figure 1 is a front elevation of a headlight, showing my implement applied thereto, Figure 2 is a plan view of the same, and, Figure 3 is a perspective view of the implement.

In the drawings, wherein for the purpose of illustration is shown a preferred embodiment of my invention, the numeral 5 designates the usual rim of the Ford headlight, which rim carries the lens. This rim is equipped with the headed studs or pins 6, ordinarily diametrically oppositely arranged, which project to the interior of the rim, to enter the L-shaped slots in the headlight casing.

My implement embodies a body portion 7, which is curved to conform to the curvature of the rim 5 and is adapted to snugly receive the same, and to extend over more than half of the area of the rim. In other words, the curved body portion 7, is more than semi-cylindrical. The body portion 7 is preferably formed of sheet or strap metal, bent into the curved approximately semi-cylindrical form, and at one end of the body portion 7, its material is bent at substantially a right angle, forming a handle attaching part 8. Upon this handle attaching part is mounted a handle 9, secured thereto by rivets 10 or the like. This handle may be formed of wood, or any other suitable material.

The curved body portion 7 is relatively stiff, but possesses slight resiliency, and is provided at its forward edge, with openings or notches 11, which lead through such forward edge. These notches have inclined outer portions 12, leading into rear closed portions 13, partly covered by shoulders 14. The peculiar shape of the notches or openings are important, as they prevent the accidental displacement of the implement, in operation, for turning the rim.

In use, the body portion 7 of the implement is placed upon the upper portion of the rim, with the handle 9 preferably extending outwardly. The notches 11 have their outer inclined ends 12 arranged in proximity to the headed studs 6, and by a slight forward turning movement of the implement, the headed studs 6 enter well into the closed recesses 13. The operator may hold the free end of the body portion 7 in contact with the rim, with downward pressure exerted upon the handle 9 with the outer hand. In this manner, the rim will be turned, and hence removed from the casing of the headlight. The implement may be readily removed from the rim, as is obvious. The implement may also be employed in returning the rim to the casing, in which event it may be reversed upon the rim, so that the handle 9 will extend inwardly.

In view of the foregoing description, it will be seen that I have provided an implement of extremely simple construction, which is well adapted to remove the rim of headlights.

As far as I am aware, no implement for this specific purpose has been produced.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, I claim:

1. An implement for removing rims from headlights of automobiles, such rims having spaced projections upon their periphery, said implement comprising a curved substantially semi-circular body portion whereby one side of the implement is open, said body portion being provided with spaced notches extending through one edge thereof, and a handle at one end of the curved body portion.

2. An implement for removing rims from headlights of automobiles, said implement comprising a curved body portion which is approximately semi-cylindrical, said body portion being provided with substantially diametrically oppositely arranged notches, said notches embodying outer inclined portions extending through the edge of said body portion and inner closed recess partly inclosed by shoulders at said edge of said body portion, and a handle carried by one end of said body portion.

3. An implement for removing rims from headlights of automobiles, said implement comprising a substantially semi-cylindrical body portion formed of strap iron bent at one end at substantially a right angle for providing a handle attaching part, a handle arranged upon said handle attaching part and secured thereto, said body portion being provided near its ends and near its intermediate portion with notches, each notch embodying an inclined outer portion leading through the edge of said body portion, and an inner closed recess partly inclosed by a shoulder at the edge of said body portion.

In testimony whereof I affix my signature.

FRANK H. BARR.